United States Patent [19]
Nakano et al.

[11] Patent Number: 5,573,107
[45] Date of Patent: Nov. 12, 1996

[54] INTERNALLY-ILLUMINABLE PUSH-BUTTON SWITCH UNIT

[75] Inventors: Sadao Nakano; Mikio Kiyosawa; Noboru Nakafuji; Toshihiro Motoki, all of Nagano-ken, Japan

[73] Assignee: Shin-Etsu Polymer Co., Ltd., Tokyo, Japan

[21] Appl. No.: 512,554

[22] Filed: Aug. 8, 1995

[30] Foreign Application Priority Data

Aug. 10, 1994 [JP] Japan ................................. 6-188106

[51] Int. Cl.⁶ ........................................... H01H 9/00
[52] U.S. Cl. ......................... 200/314; 200/313; 200/311
[58] Field of Search ................................. 200/314, 313, 200/311, 310, 512, 514, 517, 308

[56] References Cited

U.S. PATENT DOCUMENTS

| | | | |
|---|---|---|---|
| 4,937,408 | 6/1990 | Hattori et al. | 200/314 |
| 5,234,744 | 8/1993 | Kenmochi | 200/314 |
| 5,280,145 | 1/1994 | Mosier et al. | 200/314 |

*Primary Examiner*—David J. Walczak
*Attorney, Agent, or Firm*—McAulay Fisher Nissen Goldberg & Kiel, LLP

[57] ABSTRACT

An improved internally-illuminable push-button switch unit is proposed, which is an assembly comprising:
(a) an upper sheet member integrally consisting of a first elastic sheet having such a light-transmissivity as to ensure image-visibility therethrough and a key-top part made from a light-transmitting synthetic resin having a Shore D hardness of at least 40 and protruded on the upper surface of the first elastic sheet;
(b) a lower sheet member integrally consisting of a second light-transmitting elastic sheet and a click-plate presser made from a light-transmitting material and protruded on the lower surface of the second elastic sheet, the lower sheet member being positioned below the upper sheet member;
(c) a light-conducting plate positioned below the lower sheet member;
(d) a click plate positioned below the lower sheet member;
(e) a circuit board positioned below the lower sheet member; and
(f) a light source positioned below the lower sheet member and above the circuit board,
at least either one of the first and the second elastic sheets being provided on at least one of the surfaces with a colored layer.

3 Claims, 5 Drawing Sheets

INTERNALLY-ILLUMINABLE PUSH-BUTTON SWITCH UNIT

BACKGROUND OF THE INVENTION

The present invention relates to a novel internally-illuminable push-button switch unit or, more particularly, to an internally-illuminable push-button switch unit capable of being recognized even in a dark place and useful as a switching device on electronic instruments installed in mobile bodies such as car-borne audio sets, car telephones and the like as well as on electronic instruments for office and household use including pocketable calculators, telephones and the like.

Various proposals and attempts have been made heretofore for push-button switch units to be usable even in a dark place in order to ensure recognizability or visibility of the indicia appearing, for example, on the key-top. An approach therefor is to use an illuminable push-button switch unit in which the covering member for the push-button switch is provided on a light-emitting body such as LEDs. FIG. 13 of the accompanying drawing illustrates an example of such an illuminable push-button switch unit consisting generally of a base part 27, riser part 26 and key-top part 21 made from a light-transmitting material in which the key-top part 21, which supports a movable contact point of an electroconductive material on the lower surface, is provided on the top surface thereof with a light-transmitting layer 22 covered by a light-shielding colored layer 24 having an openwork 23 to indicate an indicia such as letters, signs, symbol marks and the like while a light source 25 such as an LED and the like is provided somewhere in the base part 27.

A typical method for the preparation of the covering member of the above mentioned illuminable push-button switch unit comprises the steps that a light-transmitting colored layer 22 is formed by screen printing on the top surface of the key-top part 21 made from a light-transmitting material and then a light-shielding colored covering layer 24 is formed to cover the top and side surfaces of the key-top part followed by the formation of an open-work 23 to indicate an indicia by using a laser engraver and the like. Examples of suitable material for the covering member include. silicone rubbers and organic thermoplastic elastomers such as urethane-based ones and the like in view of the requirements for the light-transmissivity to ensure visibility and elastic resilience to ensure the switching action.

The light coming from the light source 25 enters the covering member at the base part 27 and is transmitted through the covering member to reach the key-top part 21 and the light is externally emitted from the openwork 23 of indicia formed on the top surface of the light-shielding colored layer 24. Since a translucent light-diffuser layer in a suitable color, e.g., white color, is formed on the light-transmitting layer 22 in the openwork 23, the indicia given by the openwork 23 is uniformly illuminated by the light coming from the light source 25 so as to be imparted with good visibility in a dark place as well as in a well-lighted place by virtue of the contrast with the light-shielding colored layer 24 when the translucent light-diffuser layer is light-colored.

The push-button switch covering member of the above described type must satisfy several requirements: 1) that smoothness of the pushing movement of the finger tip to operate the switch should be ensured; 2) that the switching movement of the movable contact point against the fixed contact points can be felt by the pushing finger tip with reliableness; 3) that the visibility of the indicia exhibited on the top surface of the key-top can be maintained over a long period of time after many times repeated switching actions, and so on. With regard to the first requirement, the push-button switch covering members under current use are not always quite satisfactory because the top surface of the key-top made from a rubbery material such as a silicone rubber or an organic thermoplastic elastomer has its own characteristic tackiness not to ensure full smoothness of the pushing movement of the finger tip. In view of the requirement in recent years for push-button switch covering members having a more and more decreased height, it is a measure undertaken therefor to decrease the height of the riser portion 26 so that, while the feeling of reliableness in the switching operation as a consequence of the clicking touch felt by the finger tip in the buckling movement and resilience of the riser part 26, the second requirement above is satisfied less due to the decrease in the pushing stroke of the push-button switch. The third requirement for the lasting visibility of the indicia is also not always satisfied due to wearing caused by rubbing as a result of many times repeated pushing works.

SUMMARY OF THE INVENTION

The present invention accordingly has an object to provide a novel and improved internally-illuminable push-button switch unit free from the above described problems and disadvantages in the conventional internally-illuminable push-button switch units of the prior art described above.

Thus, the internally-illuminable push-button switch unit of the invention is an assembly which comprises:

(a) an upper sheet member integrally consisting of a first elastic sheet having such a light-transmissivity as to ensure image-visibility therethrough and a key-top part made from a light-transmitting synthetic resin having a Shore D hardness of at least 40 and protruded on the upper surface of the first elastic sheet;

(b) a lower sheet member integrally consisting of a second light-transmitting elastic sheet and a click-plate presser made from a light-transmitting material and protruded on the lower surface of the second elastic sheet, the lower sheet member being positioned below the upper sheet member (a);

(c) a light-conducting plate positioned below the lower sheet member;

(d) a click plate positioned below the lower sheet member;

(e) a circuit board positioned below the lower sheet member; and (f) a light source positioned below the lower sheet member and above the circuit board, at least either one of the first and the second elastic sheets being provided on at least one of the surfaces with a colored layer.

DETAILED DESCRIPTION OF THE PREFERRED EMBODIMENTS

As is described above, various parts of the inventive internally-illuminable push-button switch unit are each made from a polymeric material having light-transmissivity while the term of "light-transmissivity" here implied means that an image at one side of the member can be recognized by the viewer at the other side of the member through the member so that the member is not always required to be fully transparent without containing any small amounts of coloring agents or powdery materials.

The principal parts of the inventive internally-illuminable push-button switch unit include (a) an upper sheet member integrally consisting of a first elastic sheet and a key-top part upwardly protruded on the upper surface of the first elastic sheet, (b) a lower sheet member positioned below the upper sheet member (a) and integrally consisting of a second elastic sheet and a click-plate presser downwardly protruded on the lower surface of the second elastic sheet, (c) a light-conducting plate, (d) a click plate, (e) a circuit board and (f) a light source, the parts (c), (d), (e) and (f) each being positioned below the lower sheet member (b).

Figure 1:
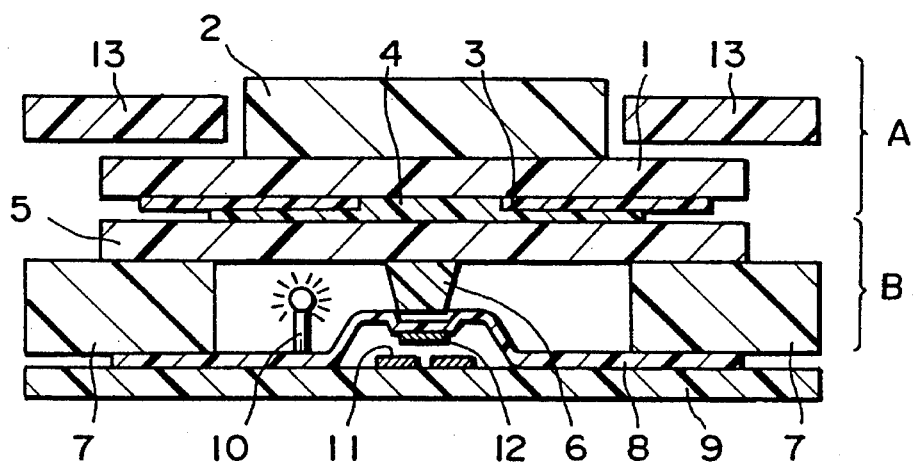
FIGS. 1 to 3 are each a vertical cross sectional view showing an example of the inventive internally-illuminable push-button switch unit.

A typical example of the inventive internally-illuminable push-button switch unit is illustrated by a vertical cross sectional view in FIG. 1. In the figure, the upper sheet member A integrally consists of a first elastic sheet 1 having light-transmissivity provided with a light-shielding colored layer 3 and a light-transmitting colored layer 4, on the lower surface of which an indicia to show the function of the switch unit is provided by printing and which fills the opening in the light-shielding colored layer 3, and a key-top part 2 made from a light-transmitting synthetic resin having a Shore D hardness of at least 40 and upwardly protruded on the upper surface of the first elastic sheet 1. The lower sheet member B, which is positioned below the upper sheet member A, integrally consists of a second light-transmitting elastic sheet 5 and a click-plate presser 6 made from a light-transmitting material protruded downwardly on the lower surface of the second elastic sheet 5 just below the key-top part 2. Below the lower sheet member B, provided are a light-conducting plate 7, click plate 8, circuit board 9 and light source 10 while a movable contact point 12 is provided on the lower surface of the click plate 8 and a pair of fixed contact points 11 are provided on the circuit board 9 to face the movable contact point 12. This assembly as a whole is contained in a housing 13.

Since the first elastic sheet 1 and key-top part 2 in the switch unit illustrated in FIG. 1 are each made from a light-transmitting material, the indicia on the surface of the light-shielding colored layer 3 formed by printing is clearly recognizable from above with the aid of the illumination from below by the light source 10 and, since the printed indicia never directly contacted with a finger tip, it is absolutely safe from abrasive wearing to ensure everlasting recognizability. When the key-top part 2 is pushed down by a finger tip or other body, the click-plate presser 6 protruded on the lower surface of the second elastic sheet 5 of the lower sheet member B pushes down the movable contact point 12 through the click plate 8 so as to close the electric circuit between the movable contact point 12 and the fixed contact points 11 on the circuit board 9. This movement of the respective parts is caused by the clicking action of the click plate 8 so that the switch operator receives a reliable touch feeling of clicking on the finger tip.

Examples of the light-transmitting elastic material to form the first elastic sheet 1 include silicone rubbers and thermoplastic elastomers such as urethane-based elastomers. Examples of the light-transmitting resin material to form the key-top part 2, which must have a Shore D hardness of 40 or higher, include acrylic and methacrylic resins, polyurethane resins, polyester resins, polycarbonate resins, dimethyl diphenyl organopolysiloxane resins and the like. The light-shielding colored layer 3 on the lower surface of the first elastic sheet i is made, for example, from an elastomer such as a silicone rubber with admixture of a pigment or filler such as carbon black and the like. The light-transmitting elastic layer 4 filling the opening in the light-shielding layer 3 is made, for example, from a light-transmitting silicone rubber with admixture of a suitable coloring agent. If desired, an indicia is provided on the lower surface of this light-transmitting colored layer 4 by printing with a pasty printing ink prepared, for example, from a liquid urethane resin admixed with a light-shielding pigment such as titanium dioxide.

In the lower sheet member B, the second elastic sheet 5 is formed from a light-transmitting elastomer which can be the same one as that forming the first elastic sheet 1 in the upper sheet member A. The click-plate presser 6 can be formed, though not particularly limitative, from a silicone rubber having an appropriate hardness.

The light-conducting plate 7, which also serves as a spacer between the second elastic sheet 5 and the click plate 8 or circuit board 9, is made from a highly light-transmitting material such as acrylic resins, polyester resins, polycarbonate resins, silicone rubbers and the like. The click plate 8, which bears the movable contact point 12 on the lower surface thereof, serves to give a clicking touch feeling to the operator's finger tip so that the material thereof is required to have a good balance between rigidity and elastic resilience. Examples of suitable materials include synthetic resins such as polyester resins and metallic materials such as aluminum or aluminum-based alloys. The circuit board 9 is made from a phenolic resin, polyester resin and the like. Though not particularly limitative, the light source 10 can be an LED or an incancdescent lamp.

Figure 2:
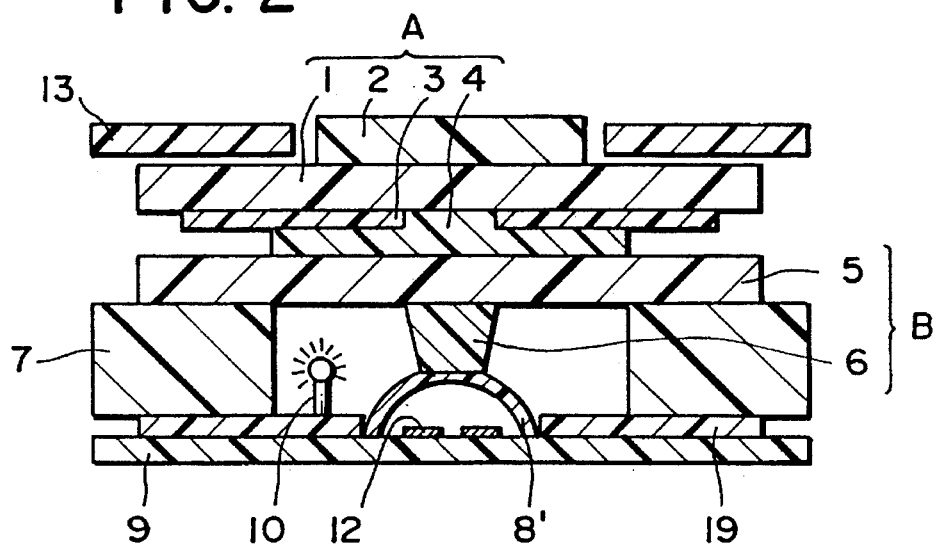

FIG. 2 illustrates a modification of the inventive switch unit shown in FIG. 1. In this embodiment, the click plate 8 in FIG. 1, which is an integral body also to serve as a spacer between the light-conducting plate 7 and the circuit board 9, is divided into a dome-like click plate 8' and a spacer sheet 19. When the click plate 8' is made from a metallic material, the movable contact point 12 in FIG. 1 can be omitted. It is desirable in this embodiment that the click-plate presser 6 is made from a rigid resin having a high hardness as in the key-top part 2.

Figure 3:
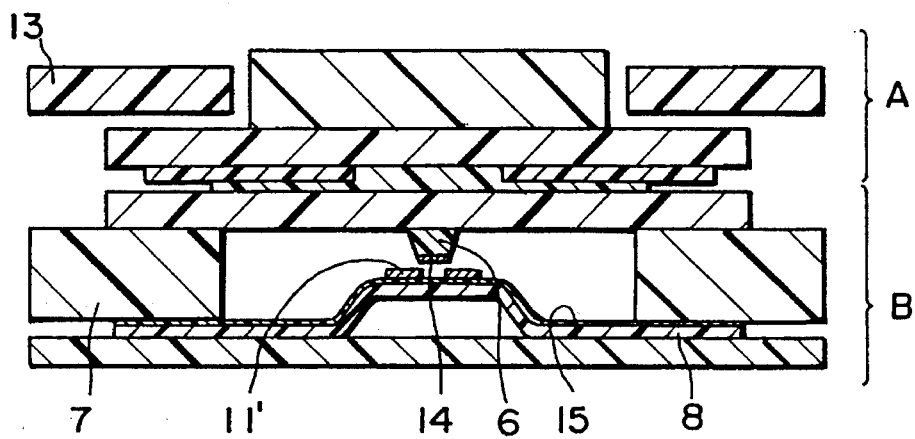

In the third embodiment illustrated in FIG. 3, the movable contact point 12 on the lower surface of the click plate 8 and the fixed contact points 11 on the circuit board 9 in FIG. 1 are omitted and, instead, a contact point 14 is provided on the lower surface of the click-plate presser 6 and the click plate 8 is provided on the upper surface to face the click-plate presser 6 with a sheet 15 made from a polyester resin and the like having high elastic resilience and bearing a pair of contact points 11' so that the switching action is effected between the click-plate presser 6 and the click plate 8.

Figure 4:
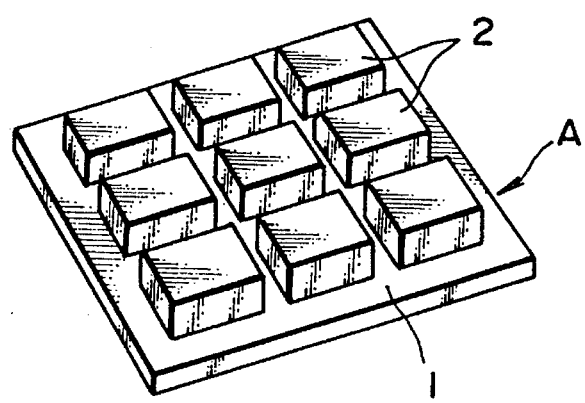
FIG. 4 is a perspective view showing an example of the upper sheet member in the inventive internally-illuminable push-button switch unit.
Figure 5:
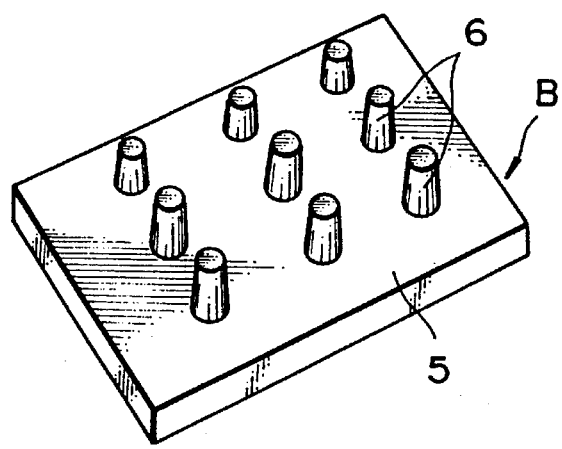
FIG. 5 is a perspective view showing an example of the lower sheet member in the inventive internally-illuminable push-button switch unit.

While each of FIGS. 1 to 3 illustrates an embodiment for a single switch unit, it is of course optional that the unit is a multiple switch unit integrally including a plural number of the switch units as is illustrate in FIG. 4 showing an upper sheet member A of a multiple switch unit containing nine single units with nine key-top parts 2 in a three-by-three down-and-across arrangement. Such a multiple upper sheet member A can of course be combined with a multiple lower sheet member B illustrated in FIG. 5 (up-side-down) with nine click-plate pressers 6.

Figure 6:
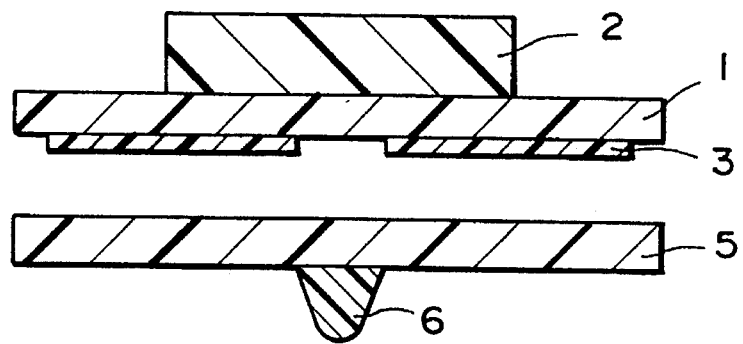
FIGS. 6 to 12 are each a vertical cross sectional view showing an example of the assembly of an upper sheet member and a lower sheet member in the inventive internally-illuminable push-button switch unit.

Various modifications can be made on the first to third embodiments illustrated in FIGS. 1 to 3. In the embodiment illustrated in FIG. 6, the light-transmitting colored layer 4 filling the opening in the light-shielding colored layer 3 is omitted so that no indicia can be given by printing on the lower surface of the layer 4. Instead, the opening in the light-shielding elastic layer 3 is formed in an openwork with a contour in the form of the desired indicia such as letters, signs, symbol marks and the like to enable the viewer to recognize the indicia from above under internal illumination.

Figure 7:
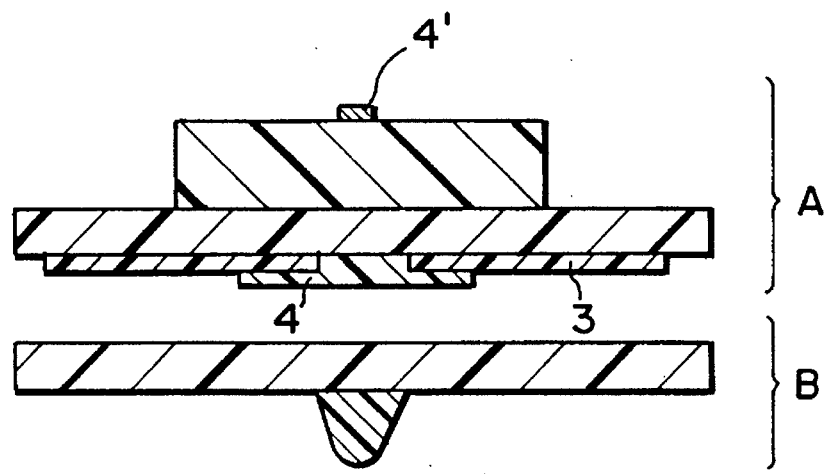

In the embodiment illustrated in FIG. 7, a light-transmitting colored layer 4' is formed on the top surface of the key-top part 2. When the color tone of this colored layer 4' is highly contrastive to the light-shielding colored layer 3 on the lower surface of the first elastic sheet 1, the indicia given by the layer 4' is clearly recognizable even in a well-lighted place.

Figure 8:
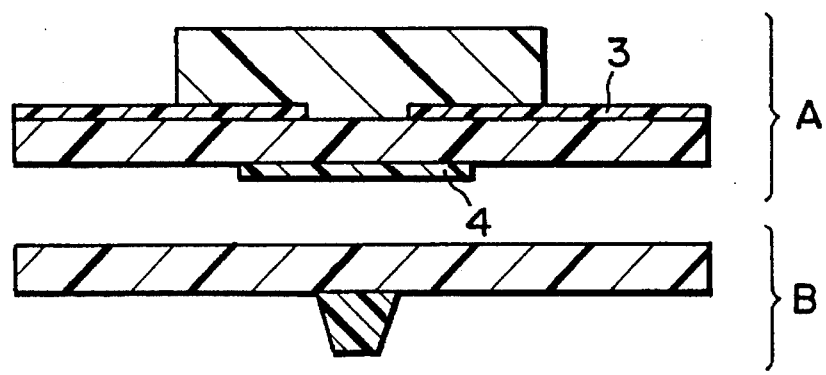
Figure 9:
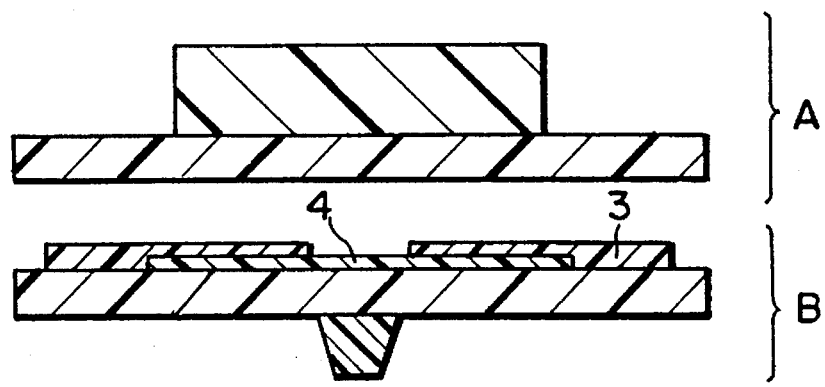
Figure 10:
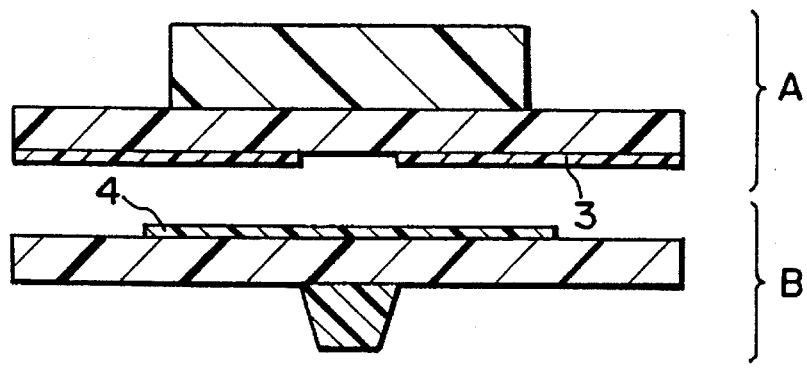

In the embodiment illustrated in FIG. 8, the light-shielding colored layer 3 is formed not on the lower surface but on the upper surface of the first elastic sheet 1 of the upper sheet member A. The opening in this light-shielding layer 3 is filled by the resin forming the key-top part 2. In the embodiment illustrated in FIG. 9, the light-shielding colored layer 3 and the light-transmitting colored layer 4 are provided not on the lower surface of the first elastic sheet 1 of the upper sheet member A but on the upper surface of the second elastic sheet 5 of the lower sheet member B. In the embodiment illustrated in FIG. 10, the light-shielding colored layer 3 and the light-transmitting colored layer 4 are not in direct contact each with the other but the former is provided on the lower surface of the first elastic sheet 1 in the upper sheet member A and the latter is provided on the upper surface of the second elastic sheet 5 in the lower sheet member B.

Figure 11:
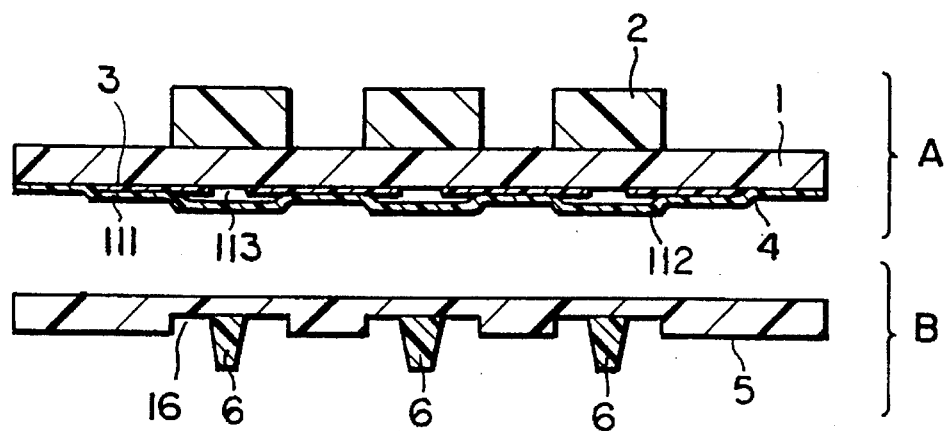
Figure 12:
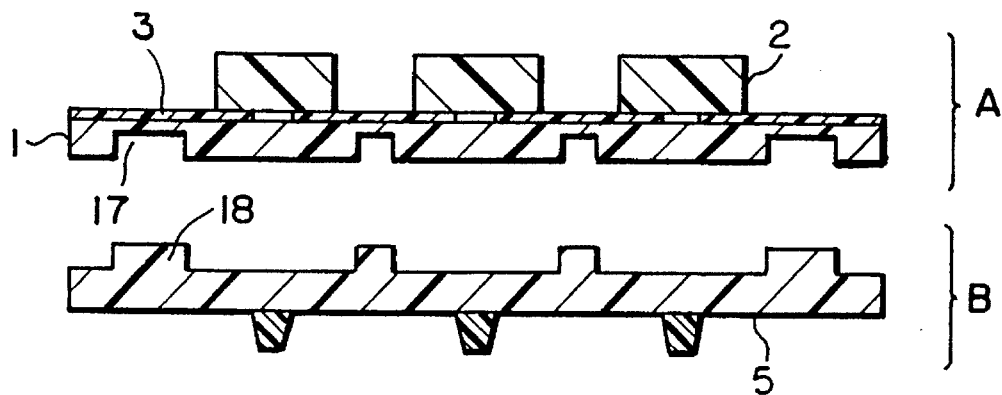
Figure 13:
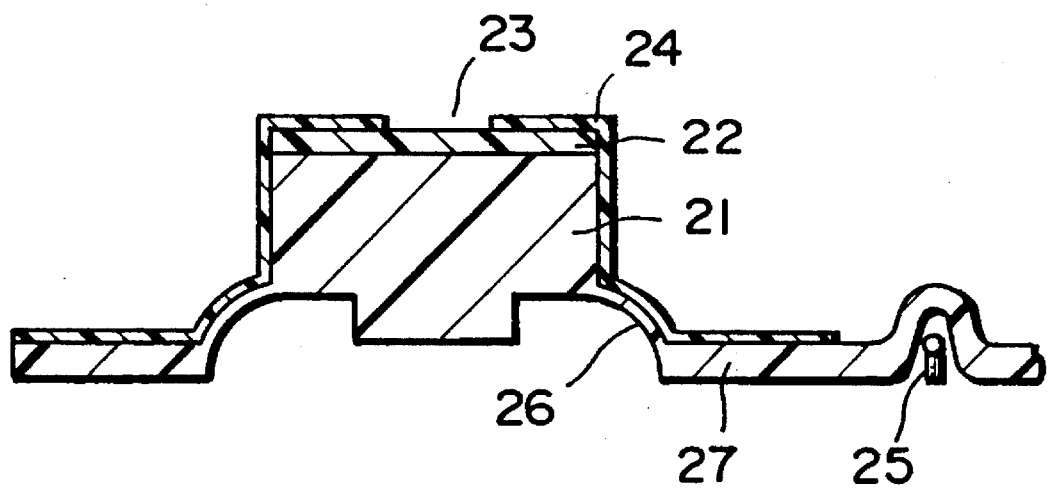
FIG. 13 is a vertical cross sectional view showing an example of conventional internally-illuminable push-button switch units.

In the embodiment illustrated in FIG. 11, which shows a 3-piece multiple switch unit, each of the click-plate pressers 6 can be attached to a recess 16 in the second elastic sheet 5 of the lower sheet member B forming a thin-walled area around the presser 6 so that the presser 6 can be pushed down by a smaller force than in the embodiment illustrated in FIG. 1. Shown in layer A are as upper sheet member A, key-top part 2 secured to the first elastic sheet 1. Attached to the bottom of first elastic sheet 1 is a light-shielding colored layer 3 having an opening 113 therein. Covering the opening is a light-transmitting colored layer 4 having protrusion therein 112 opposite click-plate presser 6 of sheet member B. In the embodiment illustrated in FIG. 12, the first elastic sheet 1 in the upper sheet member A is provided from place to place with recesses or cavities 17 while the second elastic sheet 5 in the lower sheet member B is provided with protrusions 18 each at a position corresponding to one of the cavities 17 in the first elastic sheet 1 so that, when the key-top part 2 is pushed down, the cavity 17 and the protrusion 18 come into engagement with the protrusion 18 thrusted into the cavity 17 to prevent relative displacement of the upper and lower sheet members A and B.

When a multiple switch unit is constructed comprising a plural number of the upper sheet members A as a set and a plural number of the lower sheet members B as a set, it is optional that the lower sheet members B alone are shaped in an integral multiple lower sheet member B and the upper sheet members A are combined therewith in several groups each different from the others in the structures, colors and other respects or the upper sheet members A alone are shaped in an integral multiple upper sheet member A to be combined with several groups of lower sheet members B different in performance.

While either one or both of the first and second elastic sheets in the upper and lower sheet members, respectively, are provided with one or both of the light-shielding and light-transmitting colored layers, these colored layers serve to exhibit an indicia indicating the function of the respective switch unit or to impart the switch unit with decorativeness.

The essential requirement for the key-top part is that the colored layer below or the indicia on the colored layer is visible from above through the key-top part in addition to the requirement for the Shore D hardness. In so far as the above mentioned requirement for the see-through visibility is satisfied, it is not always necessary that the material for the key-top part is highly transparent. For example, the resin material is colored in a light color by the admixture of a small amount of a coloring agent or can be admixed with a small amount of a metallic powder in order to be imparted with beautiful glittering appearance.

The upper sheet member integrally consisting of the first elastic sheet and the key-top part can be prepared by the method of integral molding of the key-top part on an elastic sheet formed in advance or can be prepared by adhesively bonding an elastic sheet and a key-top part prepared separately.

In contrast to the conventional push-button switch covering members, in which the indicia to indicate the function of the respective switch unit is provided in the form of a raised layer on the top surface of the key-top member by screen printing or pad printing, the indicia in the inventive switch unit is always provided on the elastic sheet of the upper or lower sheet member not to be exposed on the top surface of the key-top part giving advantages that the indicia has better appearance and image quality, the flatness or smoothness of the key-top surface is never decreased by the indicia and the indicia is safe from abrasive wearing to ensure a long service life.

In the following, the push-button switch unit of the invention is illustrated in more detail by way of examples.

EXAMPLE 1

The engraved cavity of a metal mold for key-top part was filled with a liquid heat-curable acrylic resin prepolymer which was heated in the metal mold to be cured into a key-top part having light-transmissivity. The key-top part after curing had a Shore D hardness of 40 or higher. Thereafter, the engraved cavity of the same metal mold for molding of an elastic sheet was filled to cover the previously formed key-top part with a light-transmitting silicone rubber composition, which was a blend of 100 parts by weight of a silicone rubber compound (KE 941U, a product by Shin-Etsu Chemical Co.) and 2 parts by weight of a curing agent recommended by the manufacturer (C-2, a product by the same company, supra), and the silicone rubber composition was cured by heating under pressure so that an integral sheet member was obtained consisting of the silicone rubber sheet and the key-top part.

In the next place, a light shielding colored layer having an openwork for a letter was formed by printing on the lower surface, i.e. the surface opposite to the key-top part, of the elastic sheet and further thereon a light-transmitting colored layer was formed by whole-surface printing to fill the openwork in the light-shielding colored layer so that an upper sheet member was completed.

In a similar manner to the above, separately, a lower sheet member integrally consisting of a second light-transmitting elastic sheet and a click-plate presser was prepared by using the same liquid acrylic resin prepolymer for the click-plate presser and the same silicone rubber composition for the second elastic sheet in a metal mold.

The thus prepared upper and lower sheet members were built in a housing made from a plastic resin together with a click plate of a polyester resin having a movable contact point at the position opposite to the click-plate presser, a light-conducting plate of a polycarbonate resin, an LED as a light source and a circuit board having a pair of fixed contact points at a position to face the movable contact point on the click plate to complete an internally-illuminable push-button switch unit of the invention.

The results of the evaluation test of this push-button switch unit by actual switching operations were very satisfactory without tackiness on the key-top surface and with very sharp and clear clicking feeling of touch given to the operator's finger tip. When used in a dark place, recognizability of the indicia formed by the light-transmitting colored layer was excellent through the key-top part. Needless to say, the indicia was absolutely safe from the troubles due to disappearance by wearing even after many times repeated switching operations.

EXAMPLE 2

The assembly of the upper sheet member and the lower sheet member was generally the same as in Example 1 except that the click-plate presser in the lower sheet member was molded from a silicone rubber composition in place of the acrylic resin prepolymer and an electroconductive layer was formed on the downwardly facing surface of the click-plate presser to serve as a movable contact point.

The click plate was made from aluminum and, in place of the fixed contact points formed on the circuit board, a polyester film having an electroconductive pattern to serve as the fixed contact points formed by printing was mounted on the click plate of aluminum to face the click-plate presser and the upper and lower sheet members and the click plate were built in a housing together with a light-conducting plate, LED, and circuit board to complete an internally-illuminable push-button switch unit.

The results of the evaluation test of this switch unit were as satisfactory as in Example 1.

What is claimed is:

1. An internally-illuminable push-button switch unit which comprises, as an assembly:

(a) an upper sheet member integrally consisting of a first elastic sheet having such a light-transmissivity as to ensure image-visibility therethrough and a key-top part made from a light-transmitting synthetic resin having a Shore D hardness of at least 40 and protruded on an upper surface of the first elastic sheet;

(b) a lower sheet member integrally consisting of a second-light transmitting elastic sheet having an upper and a lower surface, and a click-plate presser made from a light-transmitting material and protruded on the lower surface of the second elastic sheet, the lower sheet member being positioned below the upper sheet member;

(c) a light-conducting plate having an upper surface adjacent the lower surface of the second light-transmitting elastic sheet and a lower surface positioned below the second light-transmitting elastic sheet;

(d) a click plate having an upper surface adjacent the lower surface of the light conducting plate and a lower surface positioned below the lower sheet member;

(e) a circuit board having an upper surface adjacent the lower surface of the click plate; and (f) a light source positioned below the lower sheet member and above the circuit board, at least either one of the first and second elastic sheets being provided on at least one of the surfaces with a colored layer.

2. The internally-illuminable push-button switch unit as claimed in claim 1 in which at least either one of the first and the second elastic sheets is provided with a light-transmitting colored layer and a light-shielding colored layer having an opening through which the light-transmitting colored layer under illumination by the light source is seeable through the key-top part.

3. The internally-illuminable push-button switch unit as claimed in claim 1 in which the click plate has a movable contact point on the lower surface thereof and the circuit board has a pair of fixed contact points to face the movable contact point so as to be brought into contact with the movable contact point when the key-top part is pushed down.

\* \* \* \* \*